(12) United States Patent
Lee et al.

(10) Patent No.: US 11,487,081 B2
(45) Date of Patent: Nov. 1, 2022

(54) CAMERA MODULE

(71) Applicant: Samsung Electro-Mechanics Co., Ltd., Suwon-si (KR)

(72) Inventors: Kyung Hun Lee, Suwon-si (KR); Bong Won Jeong, Suwon-si (KR); Bo Sung Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 78 days.

(21) Appl. No.: 17/082,350

(22) Filed: Oct. 28, 2020

(65) Prior Publication Data
US 2021/0181460 A1    Jun. 17, 2021

(30) Foreign Application Priority Data

Dec. 13, 2019 (KR) .................. 10-2019-0166809
May 6, 2020 (KR) .................. 10-2020-0053939

(51) Int. Cl.
*G02B 7/18* (2021.01)
*G03B 5/00* (2021.01)
(Continued)

(52) U.S. Cl.
CPC ....... *G02B 7/1805* (2013.01); *G02B 26/0816* (2013.01); *G02B 26/0883* (2013.01); *G02B 27/646* (2013.01); *G03B 5/00* (2013.01); *G03B 17/17* (2013.01); *G03B 2205/003* (2013.01); *G03B 2205/0023* (2013.01); *G03B 2205/0069* (2013.01)

(58) Field of Classification Search
None
See application file for complete search history.

(56) References Cited

U.S. PATENT DOCUMENTS 10,866,430 B2    12/2020   Kim et al.
2004/0207745 A1  10/2004   Tsuruta et al.
(Continued)

FOREIGN PATENT DOCUMENTS

CN    109725474 A    5/2019
JP    2015-11353 A    1/2015
(Continued)

OTHER PUBLICATIONS

Korean Office Action dated Mar. 1, 2021 in counterpart Korean Patent Application No. 10-2020-0053939. (8 pages in English)(6 pages in Korean).
(Continued)

*Primary Examiner* — Derek S. Chapel
(74) *Attorney, Agent, or Firm* — NSIP Law

(57) ABSTRACT

A camera module includes: an optical path folding member configured to refract or reflect light incident along a first optical axis in a direction of a second optical axis intersecting the first optical axis; a driving assembly configured to provide driving force to rotate the optical path folding member on a plane intersecting the first optical axis; and a first ball bearing and a second ball bearing supporting the optical path folding member such that the optical path folding member is enabled to rotate on the plane. A distance from the first ball bearing to the first optical axis is less than a distance from the second ball bearing to the first optical axis.

20 Claims, 19 Drawing Sheets

(51) Int. Cl.
G02B 27/64     (2006.01)
G03B 17/17     (2021.01)
G02B 26/08     (2006.01)

(56) References Cited

U.S. PATENT DOCUMENTS

| | | |
|---|---|---|
| 2007/0183766 A1 | 8/2007 | Miyamori et al. |
| 2010/0195996 A1 | 8/2010 | Hagiwara et al. |
| 2014/0362242 A1 | 12/2014 | Takizawa |
| 2015/0002683 A1 | 1/2015 | Hu et al. |
| 2015/0215541 A1 | 7/2015 | Nomura et al. |
| 2018/0109660 A1 | 4/2018 | Yoon et al. |
| 2018/0224665 A1* | 8/2018 | Im .................. G02B 27/646 |
| 2019/0129197 A1 | 5/2019 | Kim et al. |
| 2019/0227257 A1 | 7/2019 | Song |
| 2020/0363626 A1* | 11/2020 | Seo .................. H04N 5/2254 |
| 2020/0400464 A1* | 12/2020 | Yedid ................ H04N 5/2257 |

FOREIGN PATENT DOCUMENTS

| | | |
|---|---|---|
| KR | 10-2018-0041040 A | 4/2018 |
| KR | 10-1942743 B1 | 1/2019 |

OTHER PUBLICATIONS

Chinese Office Action dated Dec. 1, 2021 in corresponding Chinese Patent Application No. 202011425867.3. (6 pages in English and 8 pages in Chinese).

* cited by examiner

CAMERA MODULE

CROSS-REFERENCE TO RELATED APPLICATIONS

This application claims the benefit under 35 U.S.C. § 119(a) of Korean Patent Application Nos. 10-2019-0166809 and 10-2020-0053939 filed on Dec. 13, 2019 and May 6, 2020, respectively, in the Korean Intellectual Property Office, the entire disclosures of which are incorporated herein by reference for all purposes.

BACKGROUND

1. Field

The following description relates to a camera module configured to enable image capturing or video capturing of a moving object.

2. Description of Related Art

A refractive camera module includes one or more prisms. The one or more prisms are configured to reflect or refract light incident in a first optical axis direction in a second optical axis direction. The refractive camera module may have a thin configuration. For example, the camera module is configured to have a low height in the first optical axis direction.

The refractive camera module may be configured to reduce a phenomenon of a decrease in resolution caused by user hand-shake. For example, the refractive camera module may include a driving assembly for moving one or more lenses in a direction intersecting the first optical axis. However, since the refractive camera module may not have enough space to move one or more lenses in a direction intersecting the first optical axis, a driving assembly for driving the prism to achieve an image stabilization effect is required.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes: an optical path folding member configured to refract or reflect light incident along a first optical axis in a direction of a second optical axis intersecting the first optical axis; a driving assembly configured to provide driving force to rotate the optical path folding member on a plane intersecting the first optical axis; and a first ball bearing and a second ball bearing supporting the optical path folding member such that the optical path folding member is enabled to rotate on the plane. A distance from the first ball bearing to the first optical axis is less than a distance from the second ball bearing to the first optical axis.

The first ball bearing may be disposed to coincide with the first optical axis.

The second ball bearing may include a plurality of second ball bearings disposed at intervals in a circumferential direction around the first optical axis.

The driving assembly and the second ball bearing may be disposed at intervals in a circumferential direction around the first optical axis.

The driving assembly may be disposed in a left-right symmetrical manner, centered on the second optical axis.

The driving assembly may include: a magnet member configured to rotate integrally with the optical path folding member; and a coil member disposed on the plane.

A polarity of the magnet member may be formed in a left-right asymmetrical manner, centered on the second optical axis.

The magnet member may include a left magnet member and a right magnet member, and the coil member may include a left coil member and a right coil member. The first ball bearing may be located on a virtual straight line connecting winding centers of the left coil member and the right coil member.

A distance from the first optical axis to a winding center of the coil member may be less than a distance from the first optical axis to the second ball bearing.

The camera module may further include a lens module including one or more lenses, and configured to image light emitted from the optical path folding member on an image sensor.

In another general aspect, a camera module includes: an optical path folding member configured to refract or reflect light incident along a first optical axis in a direction of a second optical axis intersecting the first optical axis; a first movable body disposed on a fixed body, and configured to rotate in a first planar direction intersecting the first optical axis; a second movable body disposed on the first movable body, receiving the optical path folding means, and configured to rotate in a second planar direction including the first optical axis and the second optical axis; and a first ball bearing and a second ball bearing configured to support the first movable body to rotate in the first planar direction with respect to the fixed body. The first ball bearing forms a center of rotation of the first movable body.

The camera module may further include a third ball bearing disposed between the first movable body and the second movable body.

The camera module may further include a first driving assembly disposed between the fixed body and the first movable body, and configured to provide driving force to rotate the first movable body in the first planar direction.

The camera module may further include a second driving assembly disposed between the fixed body and the second movable body, and configured to provide driving force to rotate the second movable body in the second planar direction.

The first driving assembly may include: a first magnet member disposed on the first movable body, and disposed in a left-right symmetrical manner, centered on the second optical axis; and a first coil member disposed on the fixed body, and disposed to face the first magnet member.

The first magnet member may have a polarity formed in a left-right asymmetrical manner, centered on the first ball bearing.

In another general aspect, a portable electronic device includes a housing and prism module disposed in the housing. The prism module includes: a movable body; and a prism retained by the moving member, and configured to refract or reflect light incident along a first optical axis in a direction of a second optical axis intersecting the first optical axis. The portable electronic device includes: a magnet member disposed on the movable body; a coil member disposed on a surface of the housing and configured to interact with the magnet member to rotate the movable body on a first plane intersecting the first optical axis; and a first ball bearing and a second ball bearing disposed on the surface of the housing, and supporting the movable body to rotate on the first plane. A distance from the first ball bearing to the first optical axis is less than a distance from the second ball bearing to the first optical axis.

The magnet member may include two magnet members spaced apart from the second optical axis in opposite directions. The coil member may include two coil members spaced apart from the second optical axis in the opposite directions.

The first ball bearing may be located on a virtual straight line connecting winding centers of the coil members.

The second ball bearing may include two second ball bearings configured to move orbitally in guide grooves on the surface of the housing.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
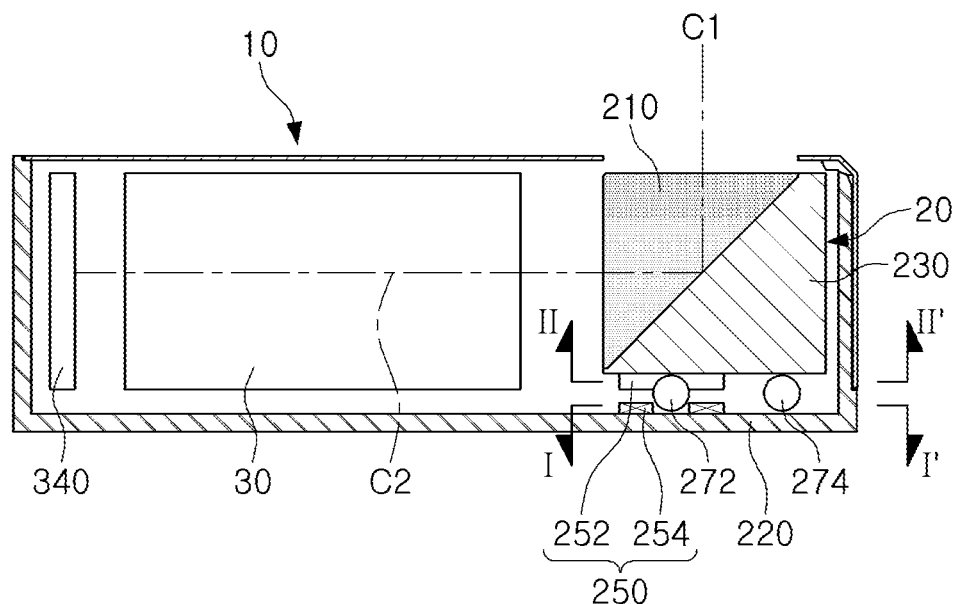
FIG. 1 is a configuration diagram of a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

Figure 2:
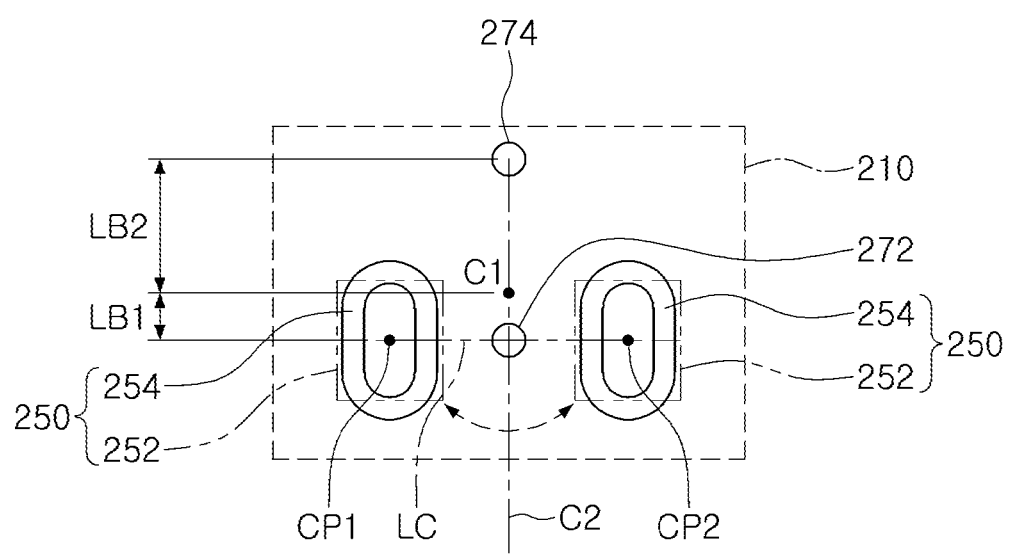
FIG. 2 is a plan view taken along line I-I of a prism module illustrated in FIG. 1.
Figure 3:
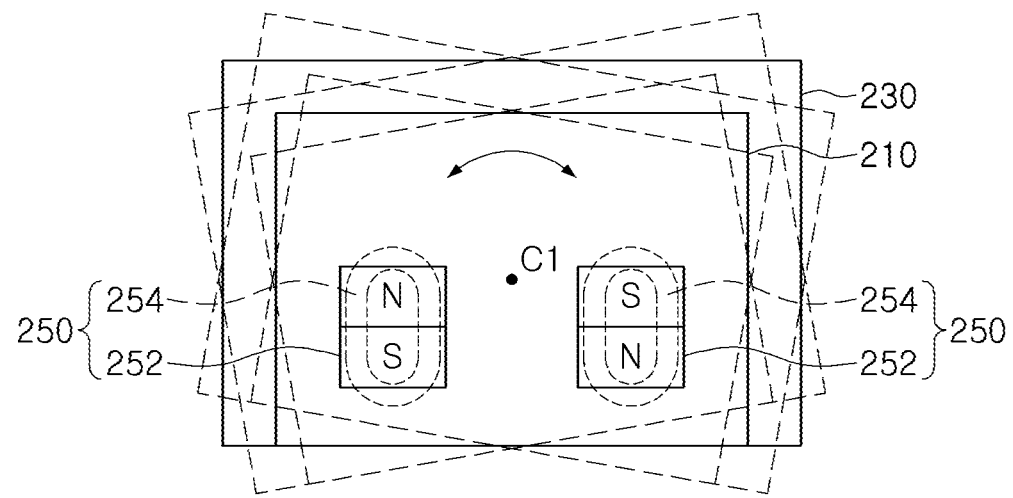
FIG. 3 is a bottom view taken along line II-II of the prism module illustrated in FIG. 2.

FIGS. 1 to 3 illustrate a camera module 10, according to an embodiment.

The camera module 10 may be mounted to a portable electronic product. For example, the camera module 10 may be mounted on a mobile phone, laptop, or the like. However, an application of the camera module 10 is not limited to the above-described electronic products. For example, the camera module 10 may be installed in an automated teller machine (ATM), a television for interactive broadcasting, and the like.

The camera module 10 includes, for example a prism module 20 and a lens module 30. However, the configuration of the camera module 10 is not limited to these modules. For example, the camera module 10 may include a fixed body 220, and an image sensor 340. For example, the fixed body 220 may form a housing constituting an exterior of the camera module 10.

The prism module 20 may include an optical path folding member. For example, the optical path folding member may be a prism 210. However, the optical path folding member is not limited to a prism. For example, a reflector may be employed as another form of the optical path folding member. The prism 210 is configured to convert an optical path incident on the camera module 10. For example, the prism 210 may refract or reflect light incident in a direction of a first optical axis C1 (hereinafter "first optical axis direction) in a direction of a second optical axis C2 (hereinafter "second optical axis direction").

For convenience, the following description includes references to the prism 210 in connection with other components, elements, and features of the camera module 10. However, it is to be understood that the following description may apply to other types of optical path folding members.

The prism module 20 may include a structure supporting the optical prism 210. For example, the prism module 20 may include a first movable body 230. The first movable body 230 may be coupled to the prism 210. For example, the first movable body 230 may be coupled to at least one surface among back and side surfaces of the prism 210 to support the position of the prism 210 such that the prism 210 does not move outside a set range. The first movable body 230 may be disposed on the fixed body 220. The prism 210 and the first movable body 230 may be configured to be rotatable with respect to the fixed body 220. For example, the fixed body 220 may rotate on a first plane (e.g., a bottom surface of the fixed body 220) intersecting the first optical axis C1 together with the prism 210.

The lens module 30 may include one or more components configured to image light emitted from the prism 210 to the image sensor 340. For example, the lens module 30 may include one or more lenses. The lens module 30 may be configured to be movable. For example, the lens module 30 may move along the second optical axis C2 to enable focus adjustment of the camera module 10.

The camera module 10 may further include a driving assembly. For example, the camera module 10 may include a first driving assembly 250 configured to provide driving force to drive rotational movement of the prism 210. The first driving assembly 250 may include first magnet members 252 and first coil members 254. The first magnet members 252 may be disposed to rotate integrally with the prism 210. For example, the first magnet members 252 may be disposed on the prism 210 or the first movable body 230, and may rotate and move on the first plane, together with the prism 210. The first coil members 254 may be disposed on the first plane, functioning as a reference for rotational movement of the optical path folding means. For example, the first coil members 254 may be disposed on a bottom surface of the fixed body 220. The first driving assembly 250 may be disposed in a left-right symmetrical manner, centered on the second optical axis C2. For example, the first magnet members 252 may be disposed on the prism 210 or the first movable body 230 in a left-right manner, centered on the second optical axis C2, and the first coil members 254 may be disposed on the fixed body 220 in a left-right symmetrical manner, centered on the second optical axis C2. That is, the first magnet members 252 may include a left first magnet member 252 disposed leftward of the second optical axis C2 and a right first magnet member 252 disposed rightward of the second optical axis C2, and the first coil member 254 may include a left first coil portion 254 leftward of the second optical axis C2 and a right first magnet portion disposed rightward of the second optical axis C2.

A polarity of each of the first magnet members 252 may be formed along the second optical axis C2. For example, the polarity of the first magnet members 252 may be formed in an order of N-pole and S-pole, or S-pole and N-pole, along the second optical axis C2. The polarity of the first magnet members 252 may be formed in a left-right asymmetrical manner, centered on the second optical axis C2. For example, the polarity of the first magnet member 252 disposed on one side of the second optical axis C2 (e.g., the left first magnet member 252, may be formed in an order of N pole and S pole, and the polarity of the first magnet member 252 disposed on the other side of the second optical axis C2, (e.g., the right first magnet member 252) may be formed in an order of S pole and N pole (see FIG. 3).

The camera module 10 may further include a means for supporting the optical path folding means so that the rotational movement of the optical path folding means is undertaken. For example, the camera module 10 may include a first ball bearing 272 and a second ball bearing 274. The first ball bearing 272 and the second ball bearing 274 may be disposed between the optical path folding means and a first plane. In other words, the first ball bearing 272 and the second ball bearing 274 may be disposed between the fixed body 220 and the first movable body 230, so that they enable smooth rotational movement of the prism 210 and the first movable body 230.

Either one of the first ball bearing 272 and the second ball bearing 274 may be disposed adjacent to the first optical axis C1. For example, the first ball bearing 272 may be disposed adjacent to the first optical axis C1 or may be disposed to coincide with the first optical axis C1. The first ball bearing 272 and the second ball bearing 274 may be disposed at different distances from the first optical axis C1. For example, a distance LB1 from the first ball bearing 272 to the first optical axis C1 may be less than a distance LB2 from the second ball bearing 274 to the first optical axis C1. The first ball bearing 272 may be disposed side by side the first coil member 254. For example, the first ball bearing 272 may be located on a virtual straight line LC connecting centers of windings CP1 and CP2 of the left first coil member 254 and the right first coil member 254, respectively.

Since in the camera module 10 configured as above, the rotational movement of the prism module 20 (the prism 210 and the first movable body 230 may be performed centered on the first optical axis C1 or the first ball bearing 272, a configuration of a rotary shaft for directly fixing the prism 210 or the prism module 20 to the fixed body 220 may be omitted. Therefore, in the camera module 10, assembly processes may be simplified, and assembly parts may be simplified.

Next, another dispositional form of the first driving assembly 250 and the first and second ball bearings 272 and 274 will be described with reference to FIGS. 4 to 7.

First, another dispositional form of the first and second ball bearings 272 and 274 will be described with reference to FIG. 4.

Figure 4:
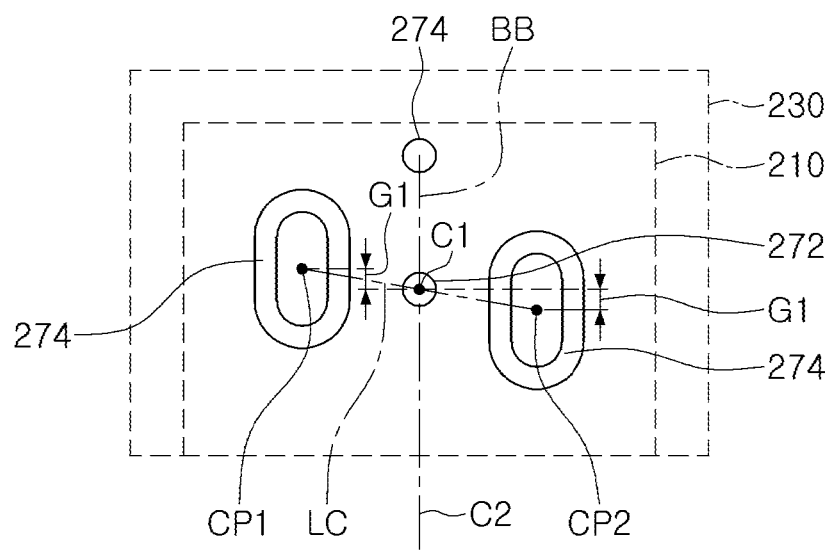
FIGS. 4 to 7 are plan views taken along line I-I of the prism module, illustrating other dispositional forms of a first driving assembly and first and second ball bearings.

Referring to FIG. 4, the first ball bearing 272 may be configured to be a center of rotation of the prism 210. For example, the first ball bearing 272 may be disposed to coincide with the first optical axis C1, as shown in FIG. 4. Further, the first ball bearing 272 may be disposed side-by-side with the left and right first coil members 254. For example, the first ball bearing 272 may be disposed on a virtual straight line LC connecting the centers of windings CP1 and CP2 of the left and right first coil members 254.

The left and right first coil members 254 may be arranged in an asymmetrical shape based on a virtual straight line BB connecting the first ball bearing 272 and the second ball bearing 274. For example, the first coil member 254 disposed on one side of the straight line BB (e.g., the left first coil member 254) may be spaced apart from the second ball bearing 274 by a first distance G1, and the first coil member 254 disposed on the other side of the straight line BB (e.g., the right first coil member 254) may be spaced apart from the second ball bearing 274 by an amount equal to the first distance G1.

The camera module 10, having the above-described dispositional form of the ball bearings 272 and 274 and the first driving assembly 250, may rapidly rotate and move the prism 210 using the first ball bearing 272 as a rotary shaft.

Other dispositional forms of the first and second ball bearing 272 and 274 will be described with reference to FIGS. 5 and 6.

Figure 5:
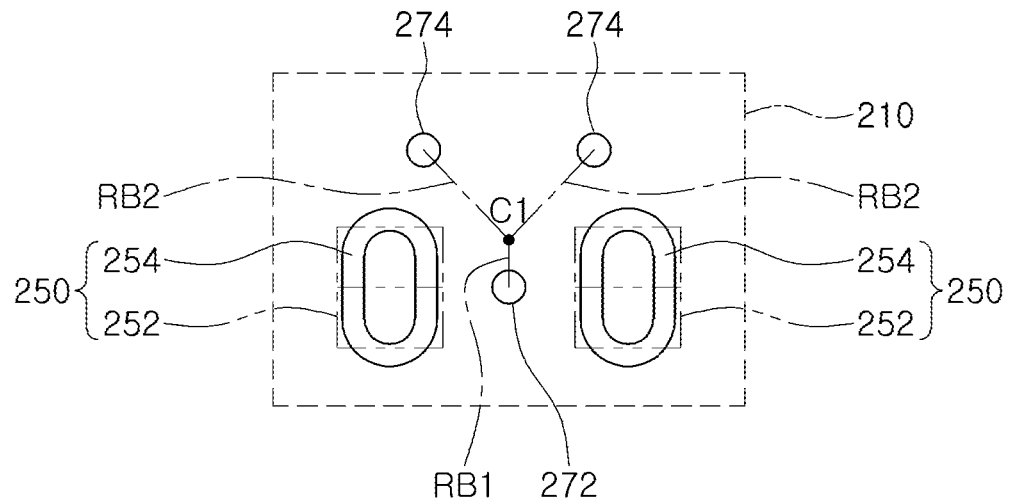

Referring to FIG. 5, a plurality of second ball bearing members 274 may be provided. For example, only one first ball bearing 272 may be provided, and two second ball bearing 274 may be provided. The second ball bearing members 274 may be disposed at intervals in a circumferential direction around the first optical axis C1. For example, the two second ball bearing members 274 may be disposed at intervals on a circumference having a predetermined radius RB2 around the first optical axis C1. The first ball bearing 272 may be disposed at a position symmetrical to the two second ball bearings 274 around the first optical axis C1. The distance RB1 from the first ball bearing 272 to the first optical axis C1 may be less than the distance RB2 from the second ball bearing 274 to the first optical axis C1.

Figure 6:
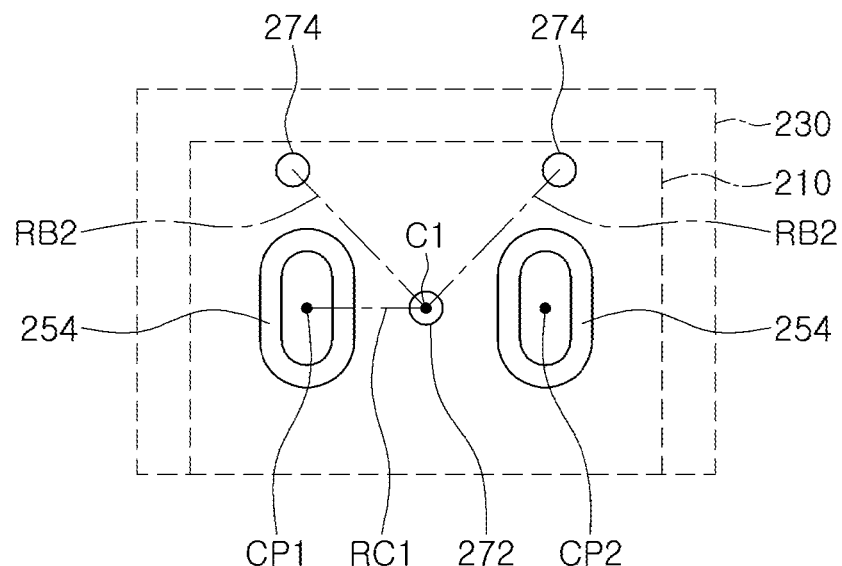

According to another example, the first ball bearing 272 may be disposed to coincide with the first optical axis C1 as illustrated in FIG. 6. The second ball bearings 274 and the first coil member 254 may be disposed at intervals in a circumferential direction around the first optical axis C1. For example, the two second ball bearing members 274 may be disposed at intervals on a circumference having a predetermined radius RB2 around the first optical axis C1, and the left and right first coil members 254 may be disposed at intervals on a circumference having a predetermined radius RC1 around the first optical axis C1. The first coil member 254 may be disposed closer to the first optical axis C1 than the second ball bearing member 274. For example, the distance RC1 from the first optical axis C1 to the centers of winding CP1 and CP2 of the first coil member 254 may be less than the distance from the first optical axis C1 to the second ball bearing member 274.

The camera module 10 having the dispositional form of the first and second ball bearings 272 and 274 described above may stably support the prism 210 through the first and second ball bearings 272 and 274, and also enable smooth rotational movement of the prism 210.

Another dispositional form of first and second ball bearings 272 and 274 will be described with reference to FIG. 7.

Figure 7:
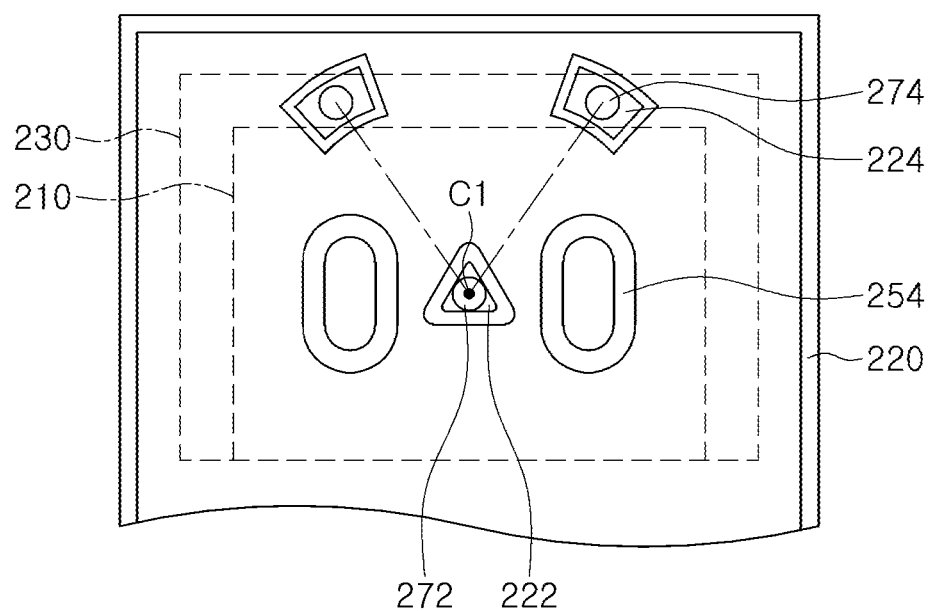

Referring to FIG. 7, the first and second ball bearings 272 and 274 may be respectively disposed in a fixing groove 222 and guide grooves 224 formed on the fixed body 220. For example, the first ball bearing 272 may be disposed in the fixing groove 222, and the second ball bearings and the second ball bearings 274 may be disposed in respective guide grooves 224. The fixing groove 222 may have a different form than that of the guide grooves 224. For example, the fixing groove 222 may be formed to have a triangular shape to enable only rotation of the first ball bearing 272, and the guide grooves 224 may have a curved shape having a predetermined height that enables orbital movement of the second ball bearings 274.

The camera module 10 configured as described above may limit a position of the first ball bearing 272, such that the first ball bearing 272 may be fixed to the center of rotation of the prism 210. Further, the camera module 10 may enable orbital movement of the second ball bearing 274 through the guide groove 224, such that smooth rotational movement of the prism 210 through the second ball bearing 274 may be performed.

FIGS. 8 to 16 illustrate a camera module 10-1, according to an embodiment.

Figure 8:
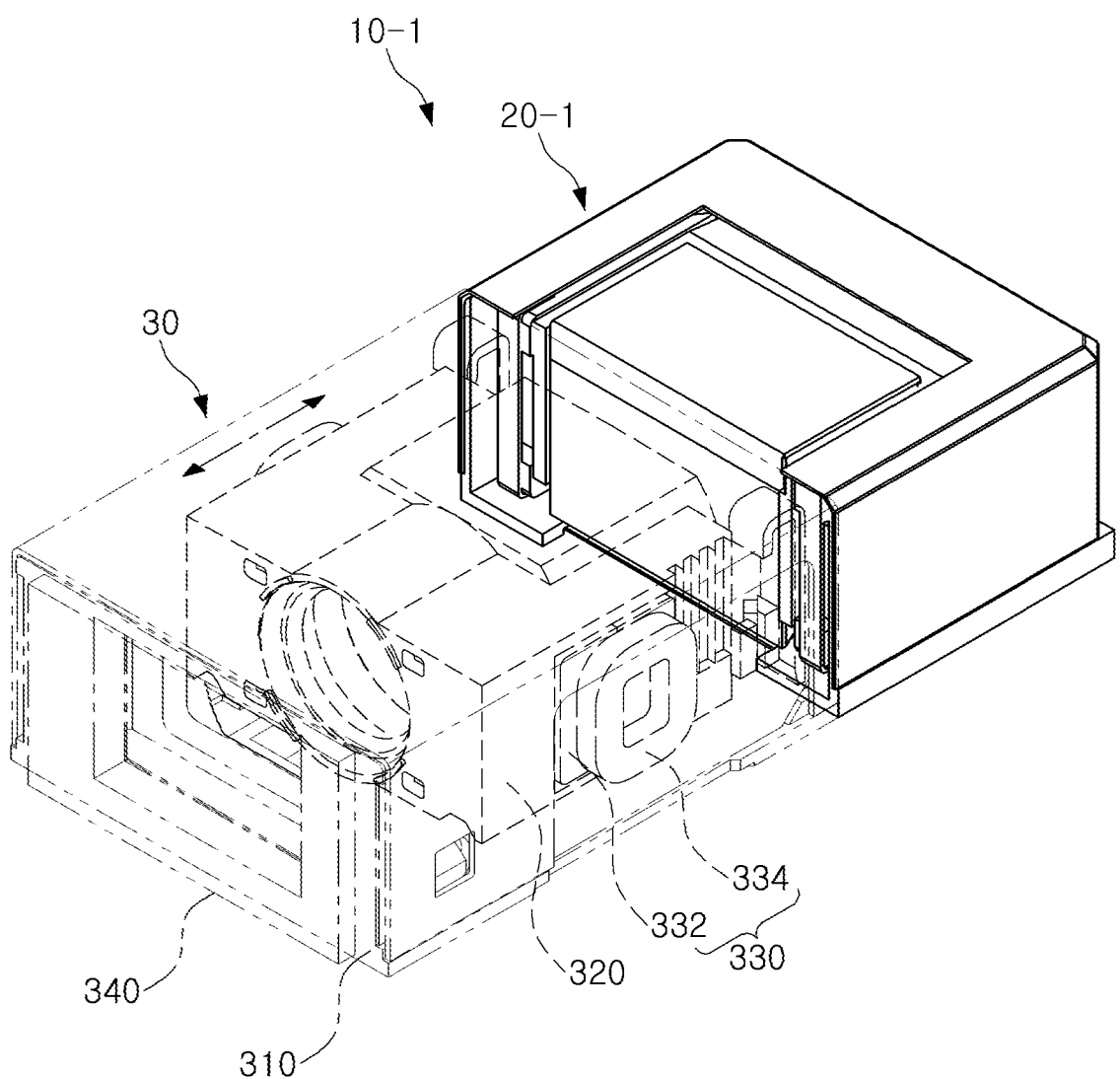
FIG. 8 is a coupled perspective view of a camera module, according to an embodiment.
Figure 9:
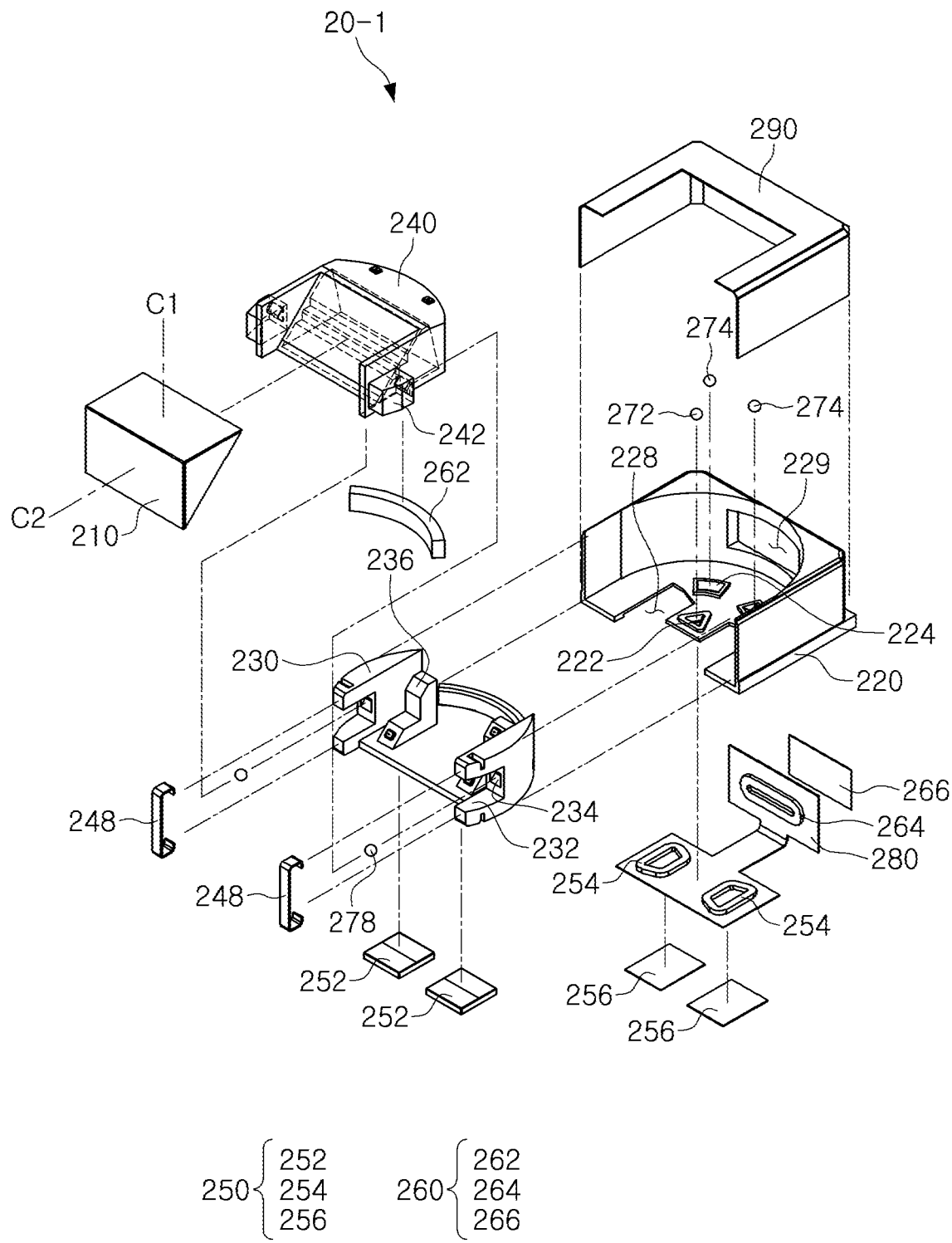
FIG. 9 is an exploded perspective view of a prism module illustrated in FIG. 8.
Figure 10:
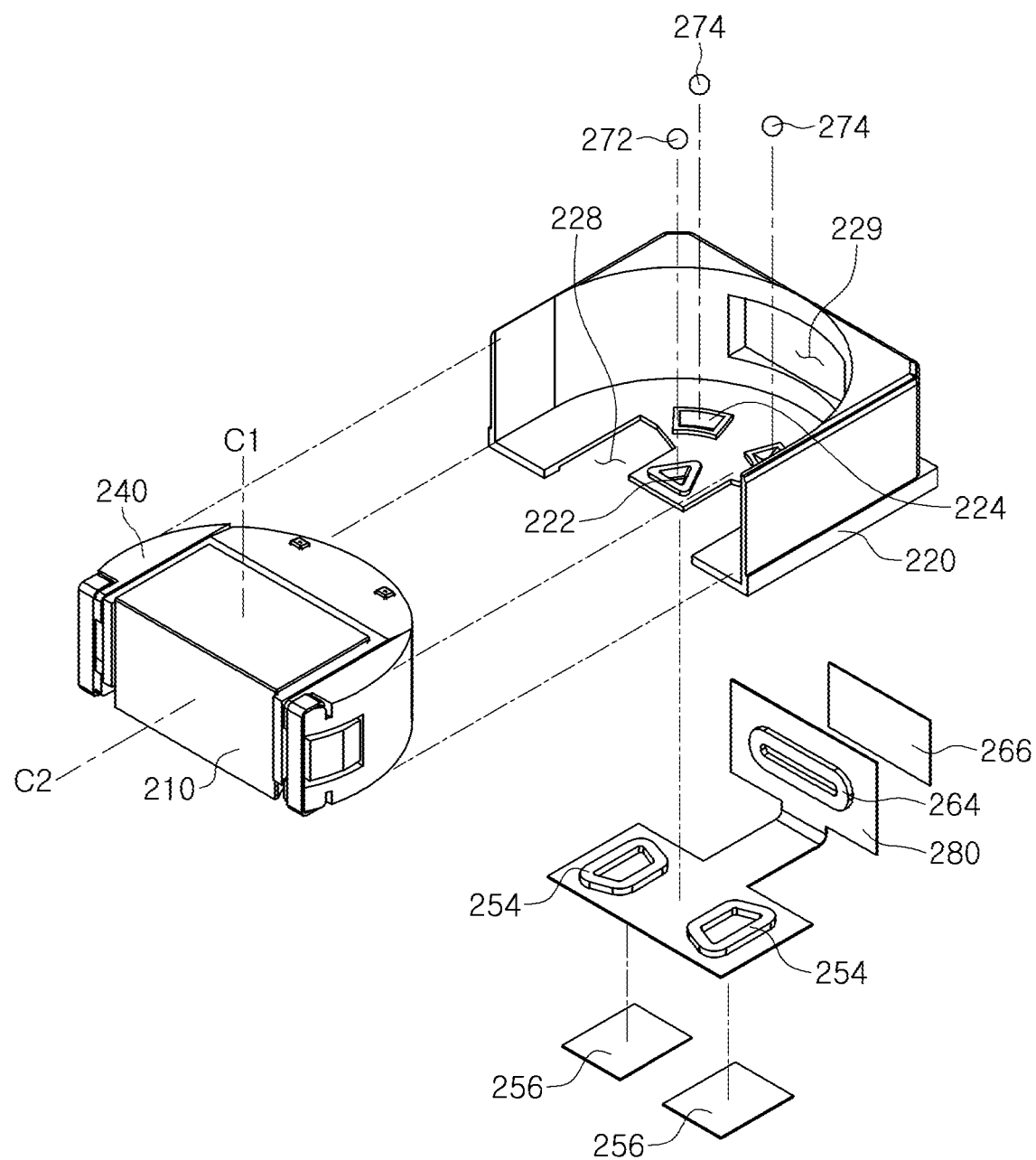
FIG. 10 is an exploded perspective view of a fixed body and a movable body illustrated in FIG. 9.

Referring to FIG. 8, the camera module 10-1 may be mounted on a portable terminal. For example, the camera module 10-1 may be mounted on a portable phone, a portable laptop, or the like. The camera module 10-1 may include the prism module 20-1 and the lens module 30.

Referring to FIG. 8, the lens module 30 may include a housing 310 and a lens barrel 320. In addition, the lens module 30 may further include a third driving assembly 330 and an image sensor 340. The housing 310 is configured to receive the lens barrel 320. The lens barrel 320 may include one or more lenses, and may be configured to move along a longitudinal direction of the housing 310. The third driving assembly 330 may include third magnet members 332 and third coil members 334. The third driving assembly 330 may drive the lens barrel 320. For example, two third magnet members 332 may be respectively disposed on opposite sides of the lens barrel 320 and two third coil members 334 may be respectively disposed on opposite sides of the housing 319. The two third magnet members 332 and the two third coil members 334 may respectively interact to move the lens barrel 320 toward one end or the other end of the housing 310. The movement of the lens barrel 320 may enable focus adjustment or focus magnification adjustment of the camera module 10.

Referring to FIGS. 9 to 16, the prism module 20-1 is configured to change an optical path. For example, the prism module 20-1 may reflect or refract light incident along the first optical axis C1 (hereinafter, "first optical axis direction") in a direction of the second optical axis C2 intersecting the first optical axis C1 (hereinafter, "second optical axis direction"). The prism module 20 may include the prism 210, the fixed body 220, the first movable body 230, and a second movable body 240. The prism module 20-1 may further include a configuration for driving the prism 210. For example, the prism module 20-1 may further include the first driving assembly 250, a second driving assembly 260, the first ball bearings 272, the second ball bearings 274, and a substrate member 280. The prism module 20 may further include a structure for shielding electromagnetic waves. For example, the prism module 20-1 may further include a shield can 290 covering the fixed body 220, the first movable body 230, and the second movable body 240.

The prism 210 is configured to convert an optical path. For example, the prism 210 may refract or reflect light incident in the first optical axis direction in the second optical axis direction. The prism 210 may have a substantially rectangular cross-sectional shape. For example, an incident surface and a reflective surface of the prism 210 may be formed at an angle of 90 degrees, and the reflective surface may be formed at an angle of 45 degrees with respect to the incident surface and the reflective surface, respectively.

The fixed body 220 may fix a position of the prism module 20-1 inside the camera module 10. For example, the fixed body 220 may be fixed so as not to move on one side of the camera module 10, and may fix a relative position of the prism module 20-1 with respect to the lens module 30. The fixed body 220 is configured to receive the first movable body 230. For example, an inside of the fixed body 220 may form a space for receiving the first movable body 230, and a front surface of the fixed body 220 may be opened to facilitate insertion and retraction of the first movable body 230.

A space for of the first and second ball bearings 272 and 274 to be disposed may be formed on the fixed body 220. For example, the fixing groove 222 and the guide grooves 224 may be formed on a bottom of the fixed body 220. The fixing groove 222 may be formed to enable only rotational movement of the first ball bearing 272. For example, a maximum width of the fixing groove 222 may be equal to or smaller than a diameter of the first ball bearing 272. The fixing groove 222 may be formed to substantially coincide with the optical axis of the prism 210. For example, the center of the fixing groove 222 may be substantially coincident with the first optical axis C1 of the prism 210. The guide grooves 224 may be formed to enable rolling movement of the second ball bearings 274. For example, a maximum length of the guide grooves 224 may be greater than a diameter of the second ball bearings 274. The guide grooves 224 may be disposed in a circumferential direction around the fixing groove 222. For example, two guide grooves 224 may be formed to form an acute angle around the fixing groove 222.

A space in which some components of the first driving assembly 250 may be disposed may be formed in the fixed body 220. For example, first cutout portions 228 for the first coil members 254 of the first driving assembly 250 to be disposed may be formed on a bottom of the fixed body 220. The first cutout portions 228 may be formed in a symmetrical manner, centered on the fixing groove 222. For example, the two first cutout portions 228 may be disposed in a left-right symmetrical manner, centered on the fixing groove 222.

Figure 11:
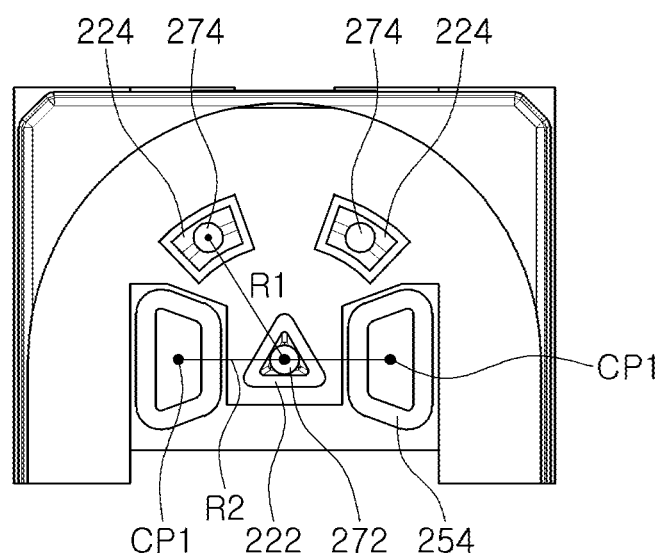
FIG. 11 is a plan view of the fixed body illustrated in FIG. 10.

The fixing groove 222, the guide groove 224, and the first coil members 254 may be disposed on the bottom of the fixed body 220, and may have a predetermined shape, as illustrated in FIG. 11. For example, a distance R2 from a center of the first coil member 254 to a center of the fixing groove 222 may be less than a distance R1 from a center of the guide groove 224 to the center of the fixing groove 222. The center of the fixing groove 222 may be disposed on a straight line connecting the centers CP1 of the first coil members 254. The second ball bearings 274 disposed in the guide groove 224 may be generally disposed along a circumferential direction around the fixing groove 222. The dispositional form of the first and second ball bearings 272 and 274 may enable smooth rotational movement, and may minimize the driving force required for the rotational driving of the first movable body 230.

A space in which some components of the second driving assembly 260 may be disposed may be formed on the fixed body 220. For example, a second cutout portion 229 in which the second coil member 264 of the second driving assembly 260 is disposed or exposed may be formed on a rear surface of the fixed body 220.

The first movable body 230 is configured to be disposed on the fixed body 220. For example, the first movable body 230 may be entirely received in an internal space of the fixed body 220. The first movable body 230 may be configured rotate with respect to the fixed body 220. For example, the first movable body 230 may be rotated around the ball bearing 272 disposed in the fixing groove 222. The first movable body 230 may be configured so that the position of first movable body 230 with respect to the fixed body 220 can be aligned. For example, a groove for receiving a portion of the ball bearing 272 may be formed on a bottom surface of the first movable body 230.

The first movable body 230 is configured to support the second movable body 240. For example, left and right receiving portions 232 configured to receive protruding portions 242 of the second movable body 240 may be respectively formed on two sides of the first movable body 230. The receiving portions 232 may be formed to limit a coupling direction of the second movable body 240. For example, the receiving portions 232 may have a shape in which a front surface of thereof is open so that the second movable body 240 may be coupled thereto through the front surface of the first movable body 230. Elements and structures that enable vertical rotation of the second movable body 240 with respect to the first movable body 230 may be disposed in the receiving portions 232. For example, third ball bearings 278 that function as rotary shaft may be respectively disposed in grooves 234 of the left and right receiving portions 232. Elements for preventing the separation of the second movable body 240 may be coupled to the receiving portions 232. For example, a clip 248 may be fitted to each of the receiving portions 232 to prevent the separation of the protruding portion 242.

The first movable body 230 may be configured to directly or indirectly support a rear portion of the second movable body 240. For example, a support portion 236 having a predetermined inclination may be formed in the first movable body 230. A magnet attached to the second movable body 240 and a yoke or magnet for providing attractive force may be disposed on the supporting portion 236.

The second movable body 240 may be rotatably disposed in the vertical direction on the first movable body 230. A third ball bearing 278 may be disposed between the first movable body 230 and the second movable body 240 to enable rotational movement of the second movable body 240. For example, the third ball bearing 278 may be disposed between the receiving portion 232 of the first movable body 230 and the protruding portion 242 of the second movable body 240 to enable the second movable body 240 to rotate in the vertical direction around the third ball bearings 278.

The second movable body 240 may be configured to support the prism 210. For example, a portion of the second movable body 240 may be inclined to be in close contact with the reflective surface of the prism 210.

The first driving assembly 250 may include the first magnet members 252, the first coil members 254, and first yoke members 256. The first magnet members 252 may be disposed on the bottom surface of the first movable body 230, and the first coil members 254 may be disposed in the first cutout portions 228 of the fixed body 220. The first coil members 254 are configured to receive current through the substrate member 280. For example, the first coil members 254 may be formed on the upper surface of the substrate member 280. The first yoke members 256 are configured to generate a predetermined amount of attractive force with the first magnet members 252 even when no current is supplied to the first coil members 254. For example, the first yoke members 256 may be formed on the lower surface of the substrate member 280 facing the first coil members 254, respectively, around the substrate member 280. The winding centers of the first coil members 254 may be formed to be located substantially on the same line as the fixing groove 222 of the fixed body 220. For example, the center of the fixing groove 222 may be located on a straight line connecting the centers of the first coil members 252. Polarities of the first magnet members 252 may be formed in a left-right asymmetrical manner, centered on the fixing groove 222. The polarity of the left first magnet member 252 disposed on one side of the fixing groove 222 may be formed in an order of N pole and S pole, and the polarity of the right first magnet member 252 disposed on the other side of the fixing groove 222 may be formed in an order of S-pole and N-pole.

Figure 12A:
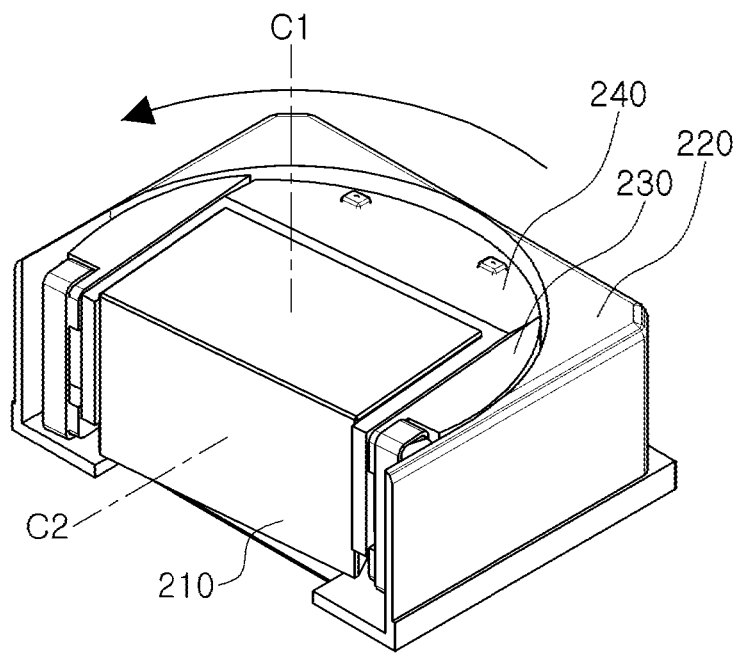
FIGS. 12A and 12B are operating state diagrams of the movable body illustrated in FIG. 10.
Figure 12B:
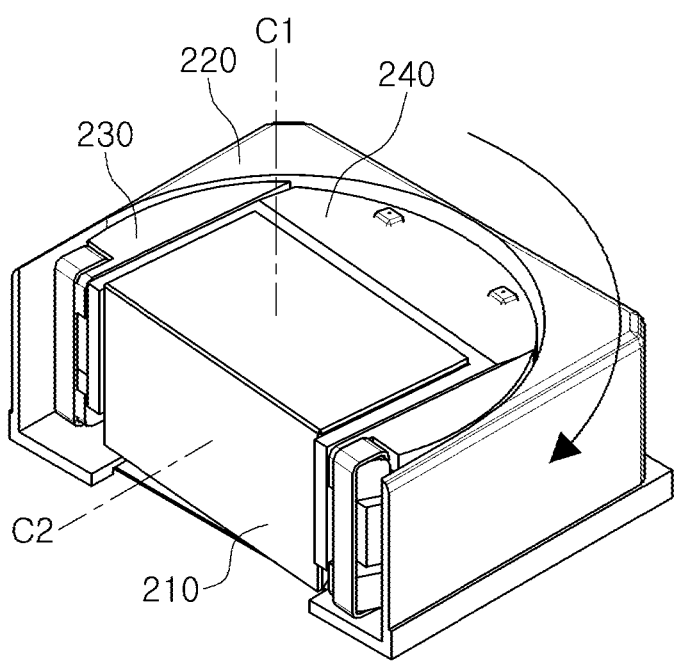
Figure 13:
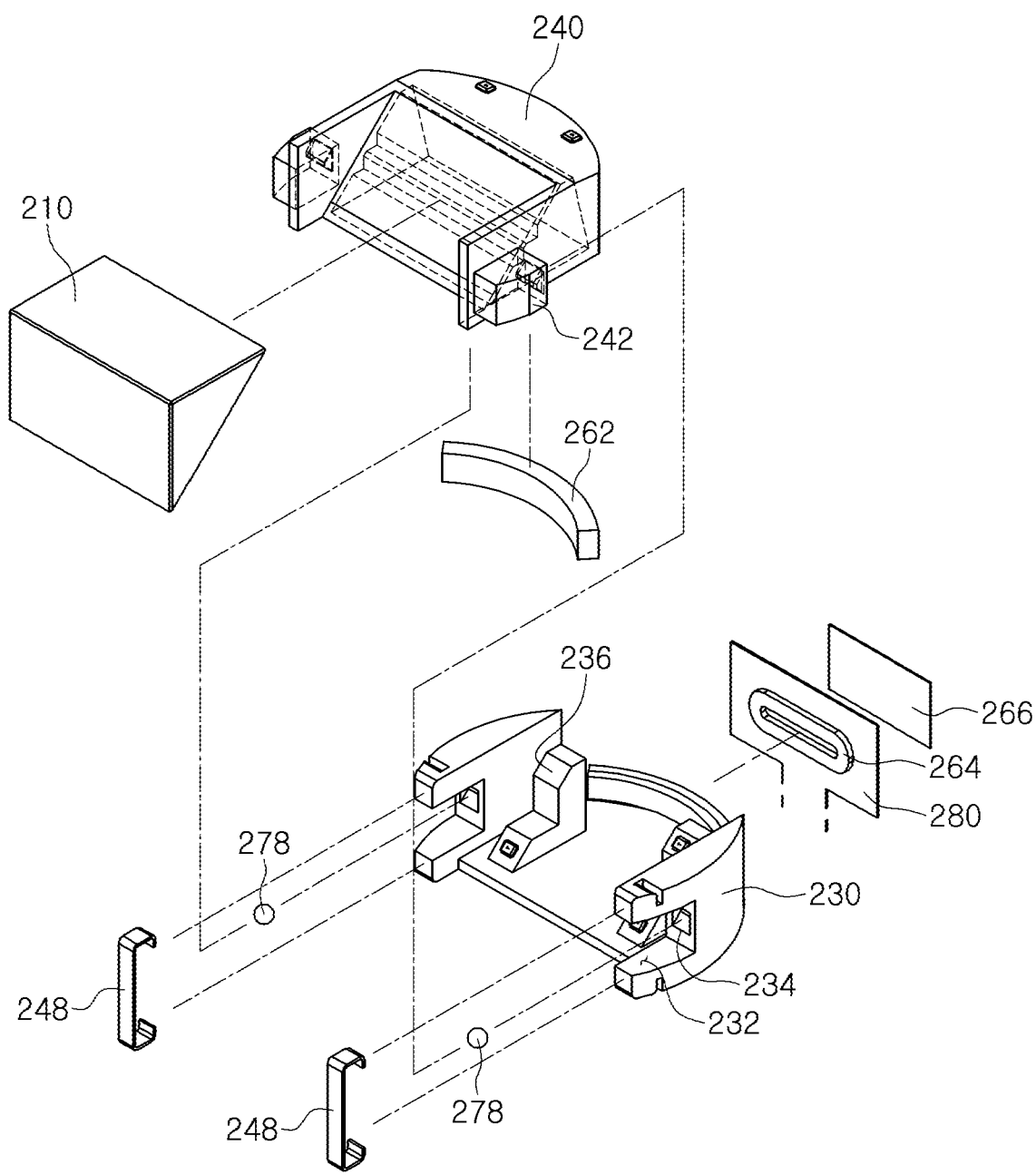
FIG. 13 is an exploded perspective view of a first movable body and a second movable body illustrated in FIG. 9.

The first driving assembly 250 is configured to generate driving force required for a rotational operation of the first movable body 230. For example, the first magnet members 252, which are disposed on a bottom of the first movable body 230, and the first coil members 254, which are disposed on the first cutout portions 228 of the fixed body 220, interact with each other, such that the first movable body 230 can be rotated clockwise or counterclockwise around the ball bearing 272, as shown in FIGS. 12A and 12B. The first driving assembly 250 may be disposed symmetrically around the second optical axis C2. For example, the first coil members 254 may be disposed symmetrically, centered on the second optical axis C2 at the bottom of the fixed body 220.

The second driving assembly 260 may include a second magnet member 262, a second coil member 264, and a second yoke member 266. The second magnet member 262 may be disposed on a rear surface of the second movable body 240, and the second coil member 264 may be disposed on or in the second cutout portion 229 of the fixed body 220. The second coil member 264 is configured to receive current through the substrate member 280. For example, the second coil member 264 may be formed on an upper surface of the substrate member 280. The second yoke member 266 and the second magnet member 262 are configured to generate attractive force having a predetermined magnitude, even when no current is supplied to the second coil member 264. For example, the second yoke member 266 may be formed on the lower surface of the substrate member 280 facing the second coil member 264. The winding center of the second coil member 264 may be formed to be positioned on the same line as the center of the third ball bearings 278. For example, the center of the third ball bearings 278 and the winding center of the second coil member 264 may be disposed on a straight line intersecting the first optical axis C1 of the prism 210.

Figure 14A:
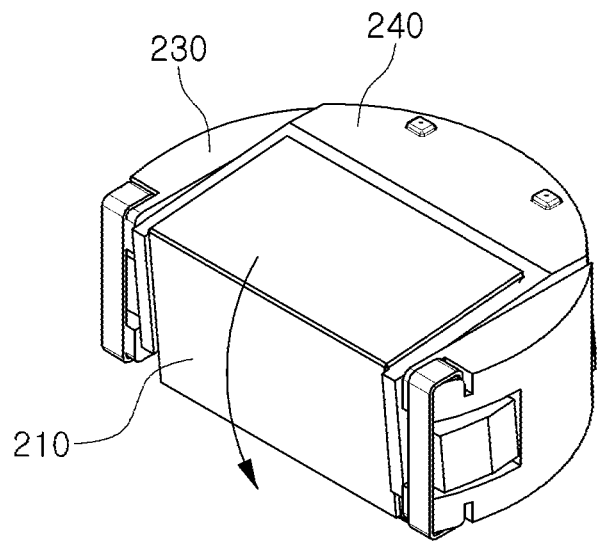
FIGS. 14A and 14B are operating state diagrams of the second movable body illustrated in FIG. 13.
Figure 14B:
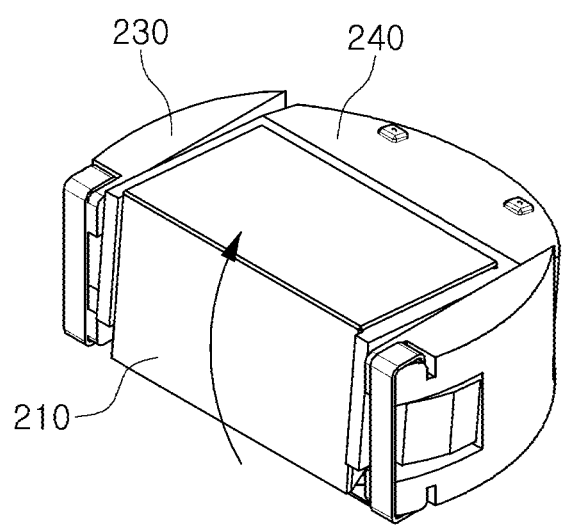
Figure 15:
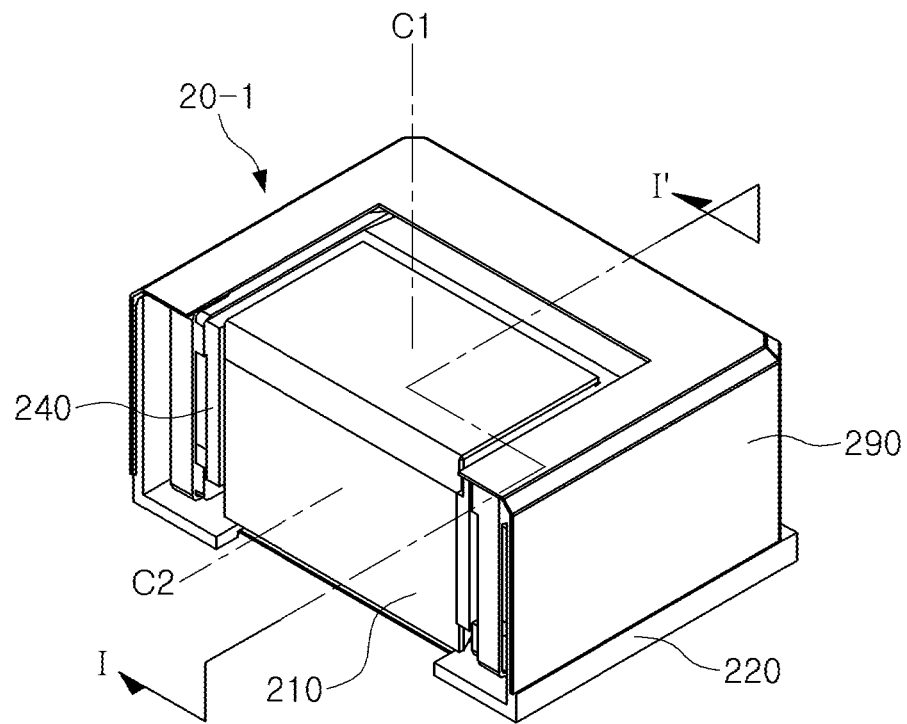
FIG. 15 is a coupled perspective view of the prism module illustrated in FIG. 9.
Figure 16:
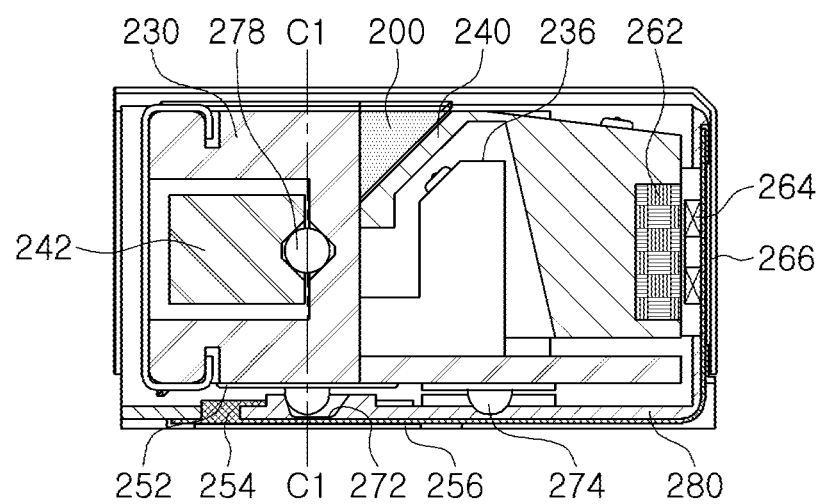
FIG. 16 is a partially cut-away cross-sectional view of the prism module illustrated in FIG. 15.
Figure 17:
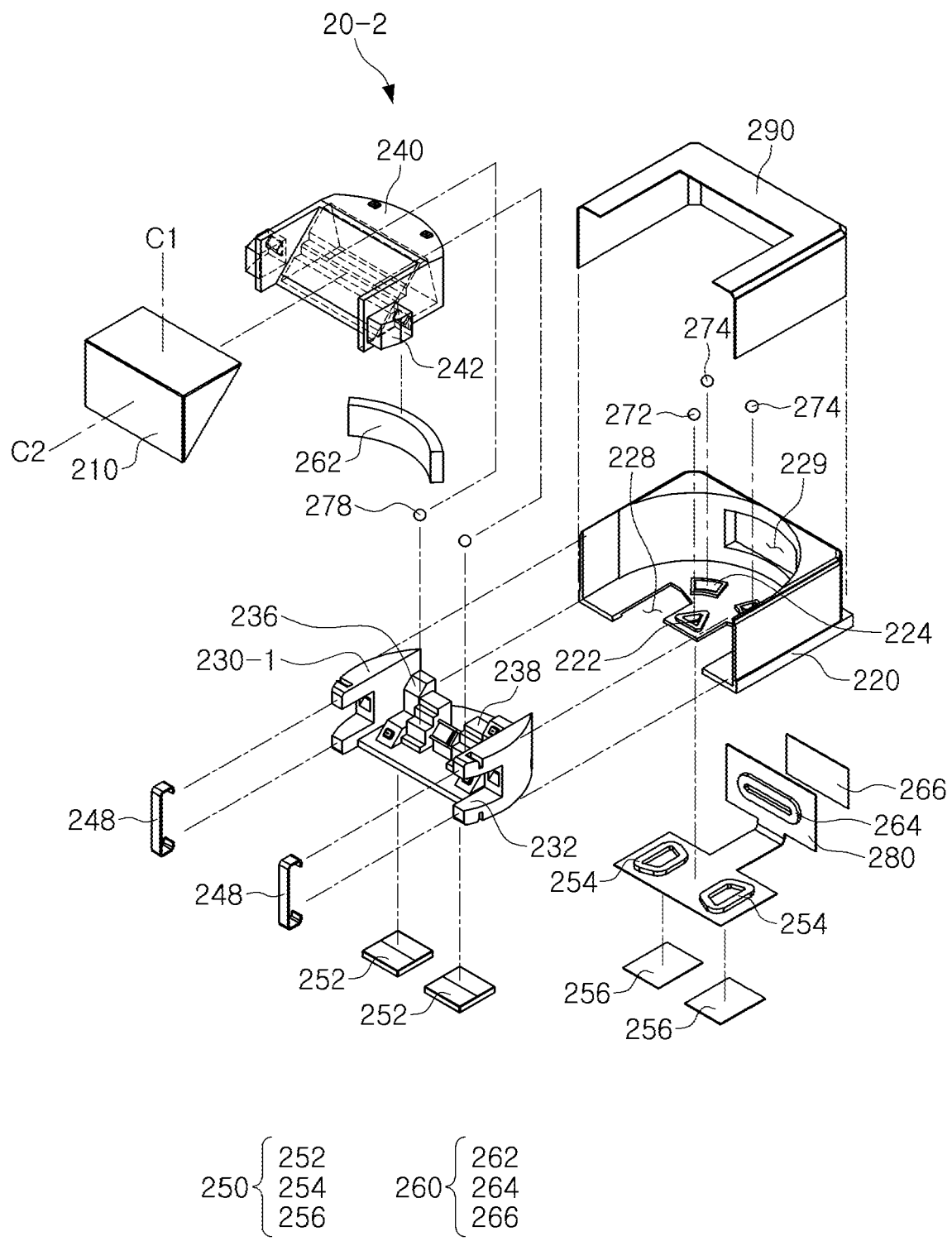
FIG. 17 is an exploded perspective view of a prism module, according to an embodiment.
Figure 18:
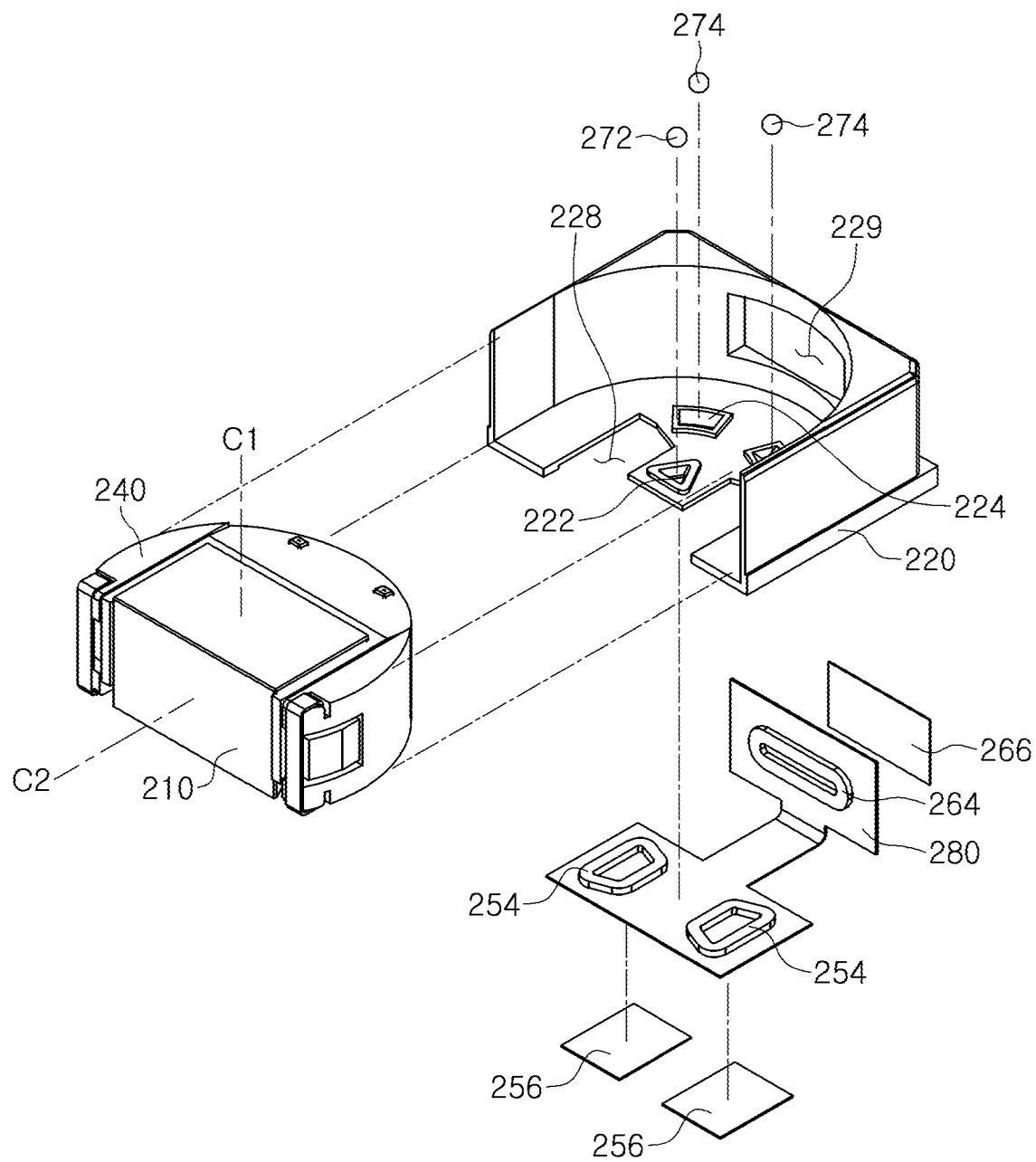
FIG. 18 is an exploded perspective view of a fixed body and a movable body illustrated in FIG. 17.

The second driving assembly 260 is configured to generate the driving to drive vertical rotation of the second movable body 240. For example, the second magnet member 262 and the second coil member 264 may interact with each other, such that the second movable body 240 may be rotated upwardly or downwardly around the third ball bearings 278, as shown in FIGS. 14A and 14B. The center of rotation of the second movable body 240 may be formed to be substantially coincident with the center of rotation of the first movable body 230. For example, the center of the third ball bearings 278 may be disposed on substantially the same line as the first ball bearing 272, as shown in FIG. 16.

The camera module 10-1 configured as above may perform image stabilization by rotating the prism 210 around the ball bearing 272 and the third ball bearings 278, respectively. Further, the camera module 10-1 may enable image capturing or video capturing of a subject moving slowly or moving rapidly by actively rotating the prism 210.

FIGS. 17 to 24 illustrate a prism module 20-2, according to an embodiment.

Referring to FIGS. 17 to 24, prism module 20-2 is configured to change an optical path. For example, the prism module 20-2 may refract or reflect light incident along the first optical axis C1 in a direction of a second optical axis C2 (hereinafter "second optical axis direction") intersecting the first optical axis C1. The prism module 20-2 may include the prism 210, the fixed body 220, a first movable body 230-1, and the second movable body 240. The prism module 20-2 may further include components for driving the prism 210. For example, the prism module 20-2 may further include the first driving assembly 250, the second driving assembly 260, the first ball bearing 272, the second ball bearings 274, and the substrate member 280. The prism module 20-2 may further include a structure for shielding electromagnetic waves. For example, the prism module 20-2 may further include the shield can 290 covering the fixed body 220 and the first and second movable bodies 230-1 and 240.

The prism 210 is configured to convert an optical path. For example, the prism 210 may refract or reflect light incident in the first optical axis direction in the second optical axis direction. The prism 210 may have a substantially rectangular cross-sectional shape. For example, the incident surface and the reflective surface of the prism 210 may be formed at an angle of 90 degrees, and the reflective surface may be formed at an angle of 45 degrees with respect to the incident surface and the reflective surface, respectively.

The fixed body 220 may fix the position of the prism module 20-2 inside the camera module 10. For example, the fixed body 220 may be fixed so as not to move on one side of the camera module 10, such that it is possible to fix a relative position of the prism module 20-2 with respect to the lens module 30. The fixed body 220 is configured to receive the first movable body 230-1. For example, an inside of the fixed body 220 may form a space for receiving the first movable body 230-1, and a front surface of the fixed body 220 may be opened to facilitate insertion and retraction of the first movable body 230-1.

A space for of the first ball bearings 272 and the second ball bearings 274 to be disposed in may be formed in the fixed body 220. For example, the fixing groove 222 and the guide grooves 224 may be formed at a bottom of the fixed body 220. The fixing groove 222 may be formed to enable only rotational movement of the ball bearing 272. For example, a maximum width of the fixing groove 222 may be equal to or smaller than a diameter of the ball bearing 272. The fixing groove 222 may be formed to substantially coincide with the optical axis of the prism 210. For example, the center of the fixing groove 222 may be substantially coincident with the first optical axis C1 of the prism 210. The guide grooves 224 may be formed to enable rolling movement of the second ball bearings 274. For example, a maximum length of the guide grooves 224 may be greater than a diameter of the second ball bearings 274. The guide grooves 224 may be disposed in a circumferential direction around the fixing groove 222. For example, two guide grooves 224 may be formed to form an acute angle around the fixing groove 222.

A space in which some components of the first driving assembly 250 can be disposed may be formed in the fixed body 220. For example, the first cutout portions 228 for disposing the first coil members 254 of the first driving assembly 250 may be formed on the bottom of the fixed body 220. The first cutout portions 228 may be disposed in a symmetrical manner, centered on the fixing groove 222. For example, two first cutout portions 228 may be disposed in a left-right symmetrical manner, centered on the fixing groove 222.

Figure 19:
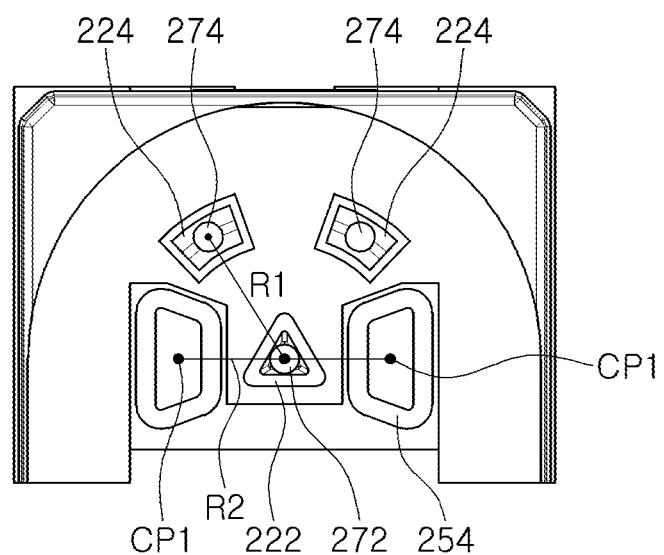
FIG. 19 is a plan view of the fixed body illustrated in FIG. 18.

As shown in FIG. 19, the fixing groove 222, the guide grooves 224, and the first coil members 254 may be disposed on the bottom of the fixed body 220 in a predetermined shape. For example, a distance R2 from a center CP1 of the first coil member 254 to a center of the fixing groove 222 may be less than a distance R1 from a center of the guide groove 224 to a center of the fixing groove 222. The center of the fixing groove 222 may be disposed on a straight line connecting the centers CP1 of the first coil members 254. The second ball bearings 274 and the guide groove 224 may be generally disposed along the circumferential direction around the fixing groove 222. This dispositional form enables smooth ration of the first movable body 230-1 while minimizing the driving force required for rotational driving of the first movable body 230-1.

A space in which some components of the second driving assembly 260 may be disposed may be formed in the fixed body 220. For example, the second cutout portion 229 for disposing or exposing the second coil member 264 of the second driving assembly 260 may be formed on a rear surface of the fixed body 220.

The first movable body 230-1 is configured to be disposed on the fixed body 220. For example, the first movable body 230-1 may be completely received state in an internal space of the fixed body 220. The first movable body 230-1 may be configured to enable rotational movement with respect to the fixed body 220. For example, the first movable body 230-1 may be rotated around the first ball bearing 272. The first movable body 230-1 may be configured so that the position of the first movable body 230-1 with respect to the fixed body 220 can be aligned. For example, a groove for receiving a portion of the first ball bearing 272 may be formed on a bottom surface of the first movable body 230-1.

The first movable body 230-1 is configured to support the second movable body 240-1. For example, support portions 238 for supporting a rear surface portion of the second movable body 240 may be formed in the first movable body 230-1. The third ball bearings 278 enabling rotational movement of the second movable body 240 may be disposed on the support portions 238. For example, the second movable body 240 may rotate in the vertical direction around the third ball bearings 278. The first movable body 230-1 may be formed with the receiving portions 232 to be coupled to the protruding portions 242 of the first movable body 240. The receiving portions 232 may be formed to limit a coupling direction of the second movable body 240. For example, the receiving portions 232 may have a shape in which a front surface thereof is open so that the second movable body 240 can be coupled thereto through the front surface of the first movable body 230-1. The receiving portions 232 may be configured to prevent separation of the second movable body 240. For example, a clip 248 may be fitted to each of the receiving portions 232 to prevent the separation of the protruding portions 242.

The first movable body 230-1 may be configured to directly or indirectly support a rear portion of the second movable body 240. For example, the support portion 236 having a predetermined inclination may be formed in the first movable body 230-1. A magnet attached to the second movable body 240 and a yoke or magnet for providing attractive force may be disposed on the support portion 236.

The second movable body 240 may be configured to support the prism 210. For example, a portion of the second movable body 240 may be inclined to be in close contact with the reflective surface of the prism 210.

The first driving assembly 250 may include the first magnet members 252, the first coil members 254, and the first yoke members 256. The first magnet members 252 may be disposed on a bottom surface of the first movable body 230-1, and the first coil members 254 may be disposed in the first cutout portions 228 of the fixed body 220. The first coil members 254 are configured to receive current through the substrate member 280. For example, the first coil members 254 may be formed on the upper surface of the substrate member 280. The first yoke members 256 are configured to generate a predetermined magnitude of attractive force with the first magnet members 252 even when no current is supplied to the first coil members 254. For example, the first yoke members 256 may be formed on the lower surface of the substrate member 280 that faces the first coil member 254. Winding centers of the first coil members 254 may be formed to be substantially located on the same line with the fixing groove 222 of the fixing body 220. For example, the center of the fixing groove 222 may be located on a straight line connecting the centers of the first coil members 252. Polarities of the first magnet members 252 may be formed in a left-right asymmetrical manner, centered on the fixing groove 222. The polarity of the left first magnet member 252 disposed on one side of the fixing groove 222 may be formed in an order of N pole and S pole, and the polarity of the right first magnet member 252 disposed on the other side of the fixing groove 222 may be formed in an order of S-pole and N-pole.

Figure 20A:
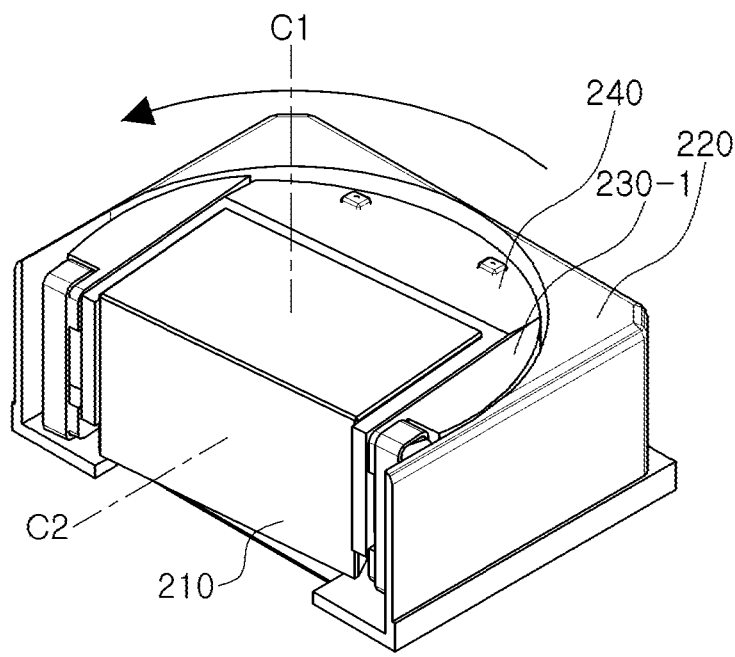
FIGS. 20A and 20B are operating state diagrams of the movable body illustrated in FIG. 18.
Figure 20B:
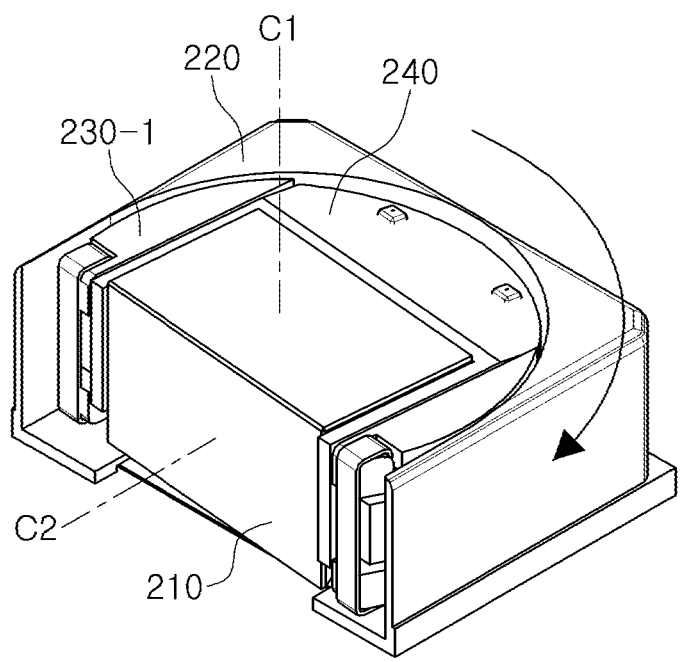
Figure 21:
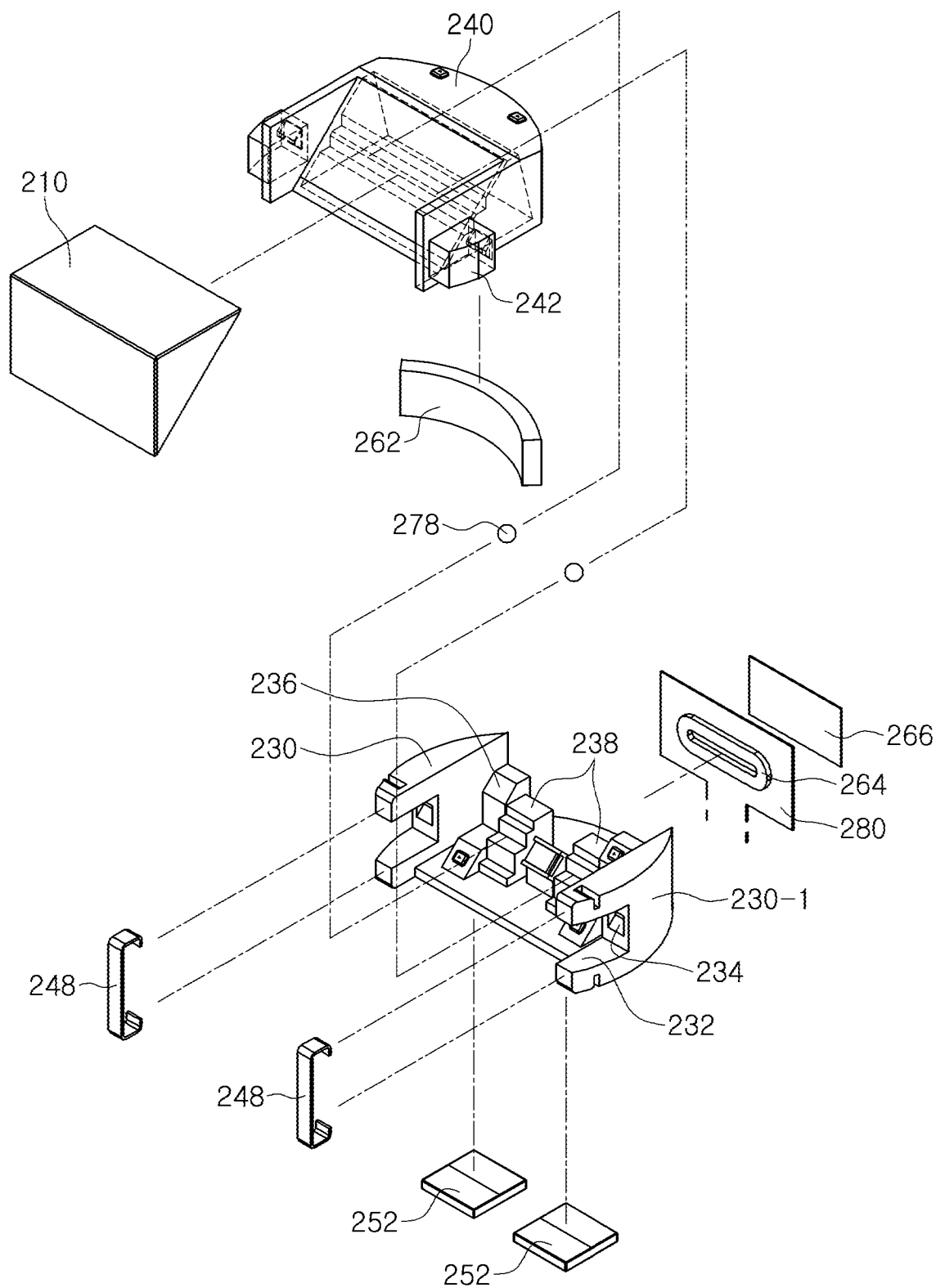
FIG. 21 is an exploded perspective view of the fixed body and the movable body illustrated in FIG. 17.

The first driving assembly 250 is configured to generate driving force to drive a rotational operation of the first movable body 230. For example, the first magnet members 252 and the first coil members 254 interact with each other, such that the first movable body 230-1 can be rotated clockwise or counterclockwise around the first ball bearing 272, as shown in FIGS. 20A and 20B.

The second driving assembly 260 may include the second magnet member 262, the second coil member 264, and the second yoke member 266. The second magnet member 262 may be disposed on the rear surface of the second movable body 240, and the second coil member 264 may be disposed on or in the second cutout portion 229 of the fixed body 220. The second coil member 264 is configured to receive current through the substrate member 280. For example, the second coil member 264 may be formed on the upper surface of the substrate member 280. The second yoke member 266 and the second magnet member 262 are configured to generate attractive force having a predetermined magnitude even when no current is supplied to the second coil member 264. For example, the second yoke member 266 may be formed on the lower surface of the substrate member 280 facing the second coil member 264. The winding center of the second coil member 264 may be formed to be positioned on the same line as the center of the third ball bearings 278. For example, the centers of the third ball bearings 278 and the winding center of the second coil member 264 may be disposed on a straight line intersecting the first optical axis C1 of the prism 210.

Figure 22A:
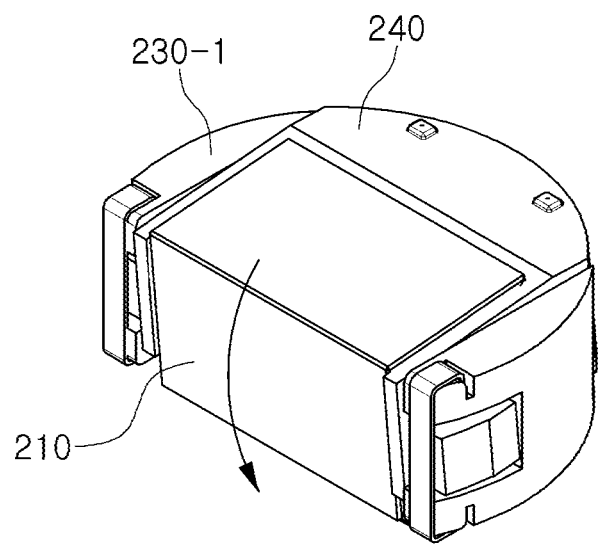
FIGS. 22A and 22B are operating state diagrams of a second movable body illustrated in FIG. 21.
Figure 22B:
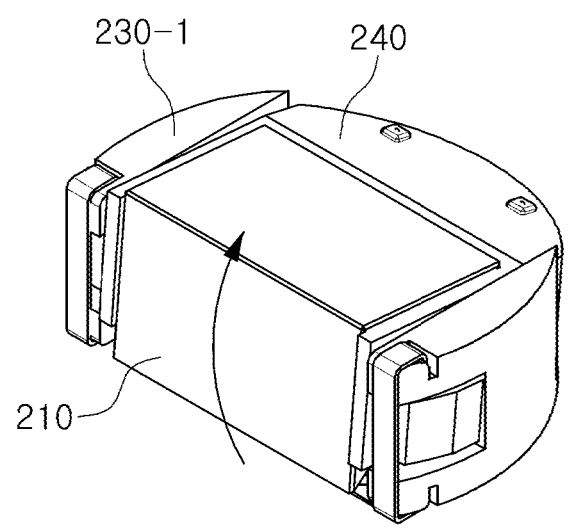
Figure 23:
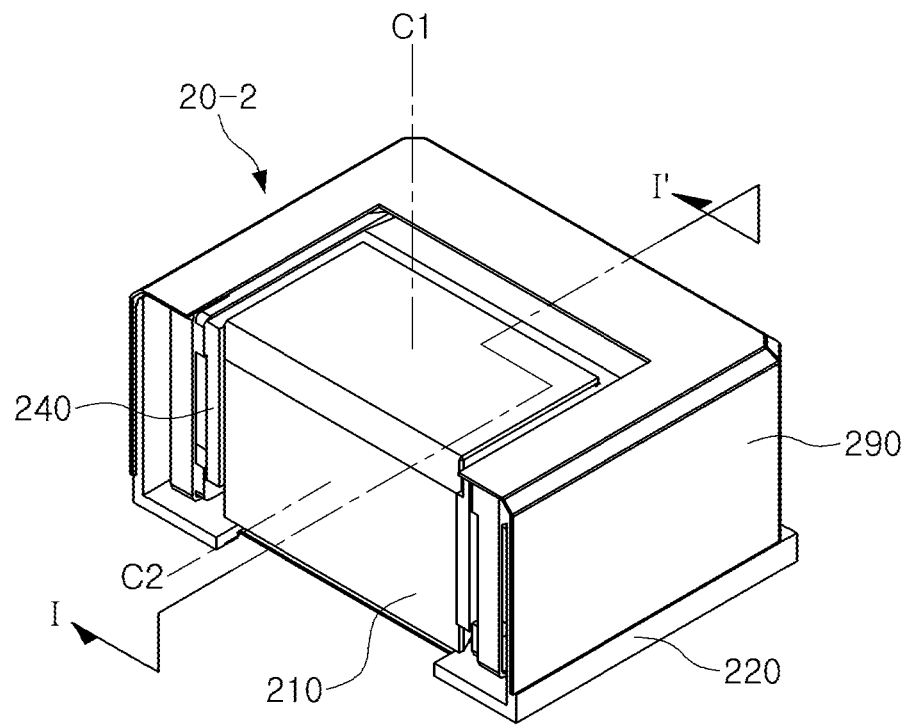
FIG. 23 is a coupled perspective view of the prism module illustrated in FIG. 17.
Figure 24:
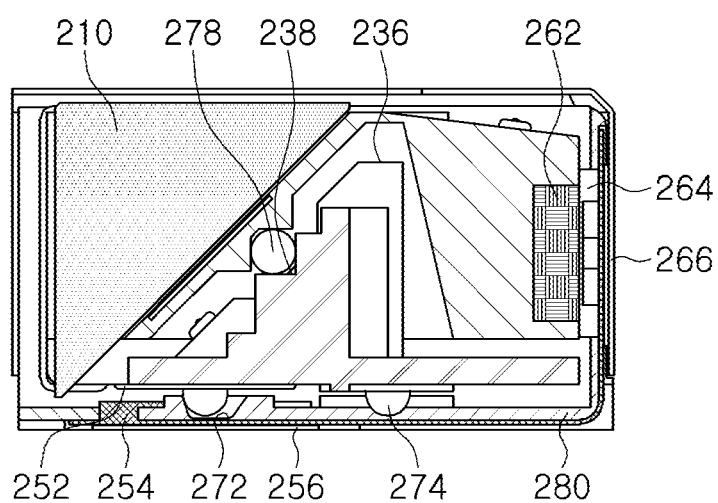
FIG. 24 is a partially cut-away cross-sectional view of the prism module illustrated in FIGS. 22A and 22B.

The second driving assembly 260 is configured to generate the driving force to drive vertical rotation of the second movable body 240. For example, the second magnet member 262 and the second coil member 264 may interact with each other, such that the second movable body 240 may be rotated upwardly or downwardly around the third ball bearings 278, as shown in FIGS. 22A and 22B. The center of rotation of the second movable body 240 may be formed such that the first movable body 230-1 is substantially coincident with the center of rotation of the second movable body 240. For example, the center of the third ball bearings 278 may be disposed substantially on the same line as the first ball bearing 272, as shown in FIG. 24.

A camera module including the prism module 20-2 configured as described above may perform image stabilization by rotating the prism 210 around the ball first bearing 272 and the third ball bearings 278, respectively. Further, the camera module may enable image capturing or video capturing of a subject moving slowly or moving rapidly by actively rotating the prism 210.

As set forth above, a camera module according to embodiments described herein may rapidly correct hand-shaking by driving a prism. Further, the camera module may drive a prism to quickly perform image capturing, continuous image capturing, and video capturing of a moving object.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   an optical path folding member configured to refract or reflect light incident along a first optical axis in a direction of a second optical axis intersecting the first optical axis;
   a driving assembly configured to provide driving force to rotate the optical path folding member on a plane intersecting the first optical axis; and
   a first ball bearing and a second ball bearing disposed on the plane supporting the optical path folding member such that the optical path folding member is enabled to rotate on the plane,
   wherein a distance from the first ball bearing to the first optical axis is less than a distance from the second ball bearing to the first optical axis.

2. The camera module of claim 1, wherein the first ball bearing is disposed to coincide with the first optical axis.

3. The camera module of claim 1, wherein the second ball bearing comprises a plurality of second ball bearings disposed at intervals in a circumferential direction around the first optical axis.

4. The camera module of claim 1, wherein the driving assembly and the second ball bearing are disposed at intervals in a circumferential direction around the first optical axis.

5. The camera module of claim 1, wherein the driving assembly is disposed in a left-right symmetrical manner, centered on the second optical axis.

6. The camera module of claim 5, wherein the driving assembly comprises:
   a magnet member configured to rotate integrally with the optical path folding member; and
   a coil member disposed on the plane.

7. The camera module of claim 6, wherein a polarity of the magnet member is formed in a left-right asymmetrical manner, centered on the second optical axis.

8. The camera module of claim 6, wherein the magnet member comprises a left magnet member and a right magnet member, and the coil member comprises a left coil member and a right coil member, and
   the first ball bearing is located on a virtual straight line connecting winding centers of the left coil member and the right coil member.

9. The camera module of claim 6, wherein a distance from the first optical axis to a winding center of the coil member is less than a distance from the first optical axis to the second ball bearing.

10. The camera module of claim 1, further comprising a lens module including one or more lenses, and configured to image light emitted from the optical path folding member on an image sensor.

11. A camera module, comprising:
    an optical path folding member configured to refract or reflect light incident along a first optical axis in a direction of a second optical axis intersecting the first optical axis;

a first movable body disposed on a fixed body, and configured to rotate in a first planar direction intersecting the first optical axis;

a second movable body disposed on the first movable body, receiving the optical path folding member, and configured to rotate in a second planar direction including the first optical axis and the second optical axis; and a first ball bearing and a second ball bearing configured to support the first movable body to rotate in the first planar direction with respect to the fixed body, wherein the first ball bearing forms a center of rotation of the first movable body.

12. The camera module of claim 11, further comprising a third ball bearing disposed between the first movable body and the second movable body.

13. The camera module of claim 11, further comprising a first driving assembly disposed between the fixed body and the first movable body, and configured to provide driving force to rotate the first movable body in the first planar direction.

14. The camera module of claim 13, wherein the first driving assembly comprises:

a first magnet member disposed on the first movable body, and disposed in a left-right symmetrical manner, centered on the second optical axis; and a first coil member disposed on the fixed body, and disposed to face the first magnet member.

15. The camera module of claim 14, wherein the first magnet member has a polarity formed in a left-right asymmetrical manner, centered on the first ball bearing.

16. The camera module of claim 11, further comprising a second driving assembly disposed between the fixed body and the second movable body, and configured to provide driving force to rotate the second movable body in the second planar direction.

17. A portable electronic device, comprising:
a housing;
a prism module disposed in the housing and comprising:
 a movable body; and
 a prism retained by the movable body, and configured to refract or reflect light incident along a first optical axis in a direction of a second optical axis intersecting the first optical axis;
a magnet member disposed on the movable body;
a coil member disposed on a surface of the housing and configured to interact with the magnet member to rotate the movable body on a first plane intersecting the first optical axis; and
a first ball bearing and a second ball bearing disposed on the surface of the housing, and supporting the movable body to rotate on the first plane,
wherein the surface of the housing is configured to intersect the first optical axis, and
wherein a distance from the first ball bearing to the first optical axis is less than a distance from the second ball bearing to the first optical axis.

18. The portable electronic device of claim 17, wherein the magnet member comprises two magnet members spaced apart from the second optical axis in opposite directions, and wherein the coil member comprises two coil members spaced apart from the second optical axis in the opposite directions.

19. The portable electronic device of claim 18, wherein the first ball bearing is located on a virtual straight line connecting winding centers of the coil members.

20. The portable electronic device of claim 17, wherein the second ball bearing comprises two second ball bearings configured to move orbitally in guide grooves on the surface of the housing.

* * * * *